(12) United States Patent
Hinman et al.

(10) Patent No.: US 9,504,049 B2
(45) Date of Patent: Nov. 22, 2016

(54) CHANNEL OPTIMIZATION IN HALF DUPLEX COMMUNICATIONS SYSTEMS

(71) Applicant: Mimosa Networks, Inc., Santa Clara, CA (US)

(72) Inventors: Brian Hinman, Los Gatos, CA (US); David Gurevich, San Mateo, CA (US); Miika Keskinen, Sunnyvale, CA (US); Vishakan Ponnampalam, Palo Alto, CA (US); Chiu Ngok Eric Wong, San Jose, CA (US)

(73) Assignee: Mimosa Networks, Inc., Santa Clara, CA (US)

( * ) Notice: Subject to any disclaimer, the term of this patent is extended or adjusted under 35 U.S.C. 154(b) by 129 days.

(21) Appl. No.: 14/325,307

(22) Filed: Jul. 7, 2014

(65) Prior Publication Data
US 2015/0215952 A1    Jul. 30, 2015

Related U.S. Application Data

(63) Continuation of application No. 14/164,081, filed on Jan. 24, 2014, now Pat. No. 9,001,689.

(51) Int. Cl.
| | |
|---|---|
| *H04W 72/08* | (2009.01) |
| *H04L 5/16* | (2006.01) |
| *H04W 24/02* | (2009.01) |
| *H04L 5/00* | (2006.01) |
| *H04L 27/00* | (2006.01) |

(52) U.S. Cl.
CPC .......... *H04W 72/085* (2013.01); *H04L 5/0033* (2013.01); *H04L 5/16* (2013.01); *H04W 24/02* (2013.01); *H04L 27/0006* (2013.01)

(58) Field of Classification Search
None
See application file for complete search history.

(56) References Cited

U.S. PATENT DOCUMENTS

| | | | |
|---|---|---|---|
| 2,735,993 A | 2/1956 | Humphrey | |
| 3,182,129 A | 5/1965 | Clark et al. | |
| D227,476 S | 6/1973 | Kennedy | |
| 4,402,566 A | 9/1983 | Powell et al. | |
| D273,111 S | 3/1984 | Hirata et al. | |

(Continued)

FOREIGN PATENT DOCUMENTS

| | | |
|---|---|---|
| CN | 303453662 S | 11/2015 |
| CN | 105191204 | 12/2015 |

(Continued)

OTHER PUBLICATIONS

Advisory Action, Jul. 31, 2014, U.S. Appl. No. 13/906,128, filed May 30, 2013.

(Continued)

*Primary Examiner* — Hassan Kizou
*Assistant Examiner* — Tejis Daya
(74) *Attorney, Agent, or Firm* — Carr & Ferrell LLP

(57) ABSTRACT

Channel Optimization in Half Duplex Communications Systems is provided herein. Methods may include obtaining at a first terminal, radio frequency (RF) spectral information local to the first terminal, analyzing at the first terminal, RF spectral information for a second terminal that is not co-located with the first terminal, transmitting data to the second terminal on a second terminal optimal frequency band, and receiving data from the second terminal on the first terminal optimal frequency band, where the first terminal optimal frequency being based upon the RF spectral information local to the first terminal.

26 Claims, 15 Drawing Sheets

(56) References Cited

U.S. PATENT DOCUMENTS

| | | | |
|---|---|---|---|
| 4,626,863 A | 12/1986 | Knop et al. |
| 4,893,288 A | 1/1990 | Maier et al. |
| 4,986,764 A | 1/1991 | Eaby et al. |
| 5,015,195 A | 5/1991 | Piriz |
| 5,226,837 A | 7/1993 | Cinibulk et al. |
| D346,598 S | 5/1994 | McCay et al. |
| D355,416 S | 2/1995 | McCay et al. |
| 5,513,380 A | 4/1996 | Ivanov et al. |
| D375,501 S | 11/1996 | Lee et al. |
| 5,580,264 A | 12/1996 | Aoyama et al. |
| D389,575 S | 1/1998 | Grasfield et al. |
| 5,746,611 A | 5/1998 | Brown et al. |
| 6,014,372 A | 1/2000 | Kent et al. |
| 6,176,739 B1 | 1/2001 | Denlinger et al. |
| 6,216,266 B1 | 4/2001 | Eastman et al. |
| D455,735 S | 4/2002 | Winslow |
| 6,421,538 B1 | 7/2002 | Byrne |
| 6,716,063 B1 | 4/2004 | Bryant et al. |
| 6,754,511 B1 | 6/2004 | Halford et al. |
| 6,847,653 B1 | 1/2005 | Smiroldo |
| D501,848 S | 2/2005 | Uehara et al. |
| 6,877,277 B2 | 4/2005 | Kussel et al. |
| 6,962,445 B2 | 11/2005 | Zimmel et al. |
| D533,899 S | 12/2006 | Ohashi et al. |
| 7,264,494 B2 | 9/2007 | Kennedy et al. |
| 7,281,856 B2 | 10/2007 | Grzegorzewska et al. |
| 7,306,485 B2 | 12/2007 | Masuzaki |
| 7,324,057 B2 | 1/2008 | Argaman et al. |
| D566,698 S | 4/2008 | Choi et al. |
| 7,362,236 B2 | 4/2008 | Hoiness |
| 7,380,984 B2 | 6/2008 | Wuester |
| 7,431,602 B2 | 10/2008 | Corona |
| 7,507,105 B1 | 3/2009 | Peters et al. |
| 7,542,717 B2 | 6/2009 | Green, Sr. et al. |
| 7,581,976 B2 | 9/2009 | Liepold et al. |
| 7,586,891 B1 | 9/2009 | Masciulli |
| 7,616,959 B2 | 11/2009 | Spenik et al. |
| 7,726,997 B2 | 6/2010 | Kennedy et al. |
| 7,778,226 B2 | 8/2010 | Rayzman et al. |
| 7,857,523 B2 | 12/2010 | Masuzaki |
| 7,929,914 B2 | 4/2011 | Tegreene |
| RE42,522 E | 7/2011 | Zimmel et al. |
| 8,069,465 B1 | 11/2011 | Bartholomay et al. |
| D674,787 S | 1/2013 | Tsuda et al. |
| 8,515,434 B1 | 8/2013 | Narendran et al. |
| D694,740 S | 12/2013 | Apostolakis |
| 8,777,660 B2 | 7/2014 | Chiarelli et al. |
| 8,792,759 B2 | 7/2014 | Benton et al. |
| 8,827,729 B2 | 9/2014 | Gunreben et al. |
| 8,836,601 B2 | 9/2014 | Sanford et al. |
| 8,935,122 B2 | 1/2015 | Stisser |
| 9,001,689 B1 | 4/2015 | Hinman et al. |
| 9,130,305 B2 | 9/2015 | Ramos et al. |
| 9,161,387 B2 | 10/2015 | Fink et al. |
| 9,179,336 B2 | 11/2015 | Fink et al. |
| 9,191,081 B2 | 11/2015 | Hinman et al. |
| D752,566 S | 3/2016 | Hinman et al. |
| 9,295,103 B2 | 3/2016 | Fink et al. |
| 9,362,629 B2 | 6/2016 | Hinman et al. |
| 2002/0102948 A1 | 8/2002 | Stanwood et al. |
| 2002/0159434 A1 | 10/2002 | Gosior et al. |
| 2003/0013452 A1 | 1/2003 | Hunt et al. |
| 2003/0027577 A1 | 2/2003 | Brown et al. |
| 2003/0169763 A1 | 9/2003 | Choi et al. |
| 2003/0224741 A1 | 12/2003 | Sugar et al. |
| 2004/0029549 A1 | 2/2004 | Fikart |
| 2004/0120277 A1 | 6/2004 | Holur et al. |
| 2004/0240376 A1 | 12/2004 | Wang et al. |
| 2005/0032479 A1 | 2/2005 | Miller et al. |
| 2005/0195758 A1 | 9/2005 | Chitrapu |
| 2005/0227625 A1 | 10/2005 | Diener |
| 2005/0271056 A1 | 12/2005 | Kaneko |
| 2006/0072518 A1 | 4/2006 | Pan et al. |
| 2006/0132602 A1 | 6/2006 | Muto et al. |
| 2006/0172578 A1 | 8/2006 | Parsons |
| 2006/0187952 A1 | 8/2006 | Kappes et al. |
| 2007/0001910 A1 | 1/2007 | Yamanaka et al. |
| 2007/0019664 A1 | 1/2007 | Benveniste |
| 2007/0060158 A1 | 3/2007 | Medepalli et al. |
| 2007/0173199 A1 | 7/2007 | Sinha |
| 2007/0173260 A1 | 7/2007 | Love et al. |
| 2007/0223701 A1 | 9/2007 | Emeott et al. |
| 2007/0238482 A1 | 10/2007 | Rayzman et al. |
| 2007/0268848 A1 | 11/2007 | Khandekar et al. |
| 2008/0109051 A1 | 5/2008 | Splinter et al. |
| 2008/0112380 A1 | 5/2008 | Fischer |
| 2008/0242342 A1 | 10/2008 | Rofougaran |
| 2009/0052362 A1 | 2/2009 | Meier et al. |
| 2009/0232026 A1 | 9/2009 | Lu |
| 2009/0233475 A1 | 9/2009 | Mildon et al. |
| 2009/0291690 A1 | 11/2009 | Guvenc et al. |
| 2010/0029282 A1 | 2/2010 | Stamoulis et al. |
| 2010/0046650 A1 | 2/2010 | Jongren et al. |
| 2010/0085950 A1 | 4/2010 | Sekiya et al. |
| 2010/0091818 A1* | 4/2010 | Sen ........... H04B 1/715 375/136 |
| 2010/0103065 A1 | 4/2010 | Shtrom et al. |
| 2010/0103066 A1 | 4/2010 | Shtrom et al. |
| 2010/0151877 A1 | 6/2010 | Lee et al. |
| 2010/0167719 A1 | 7/2010 | Sun |
| 2010/0171675 A1 | 7/2010 | Borja et al. |
| 2010/0189005 A1 | 7/2010 | Bertani et al. |
| 2010/0202613 A1* | 8/2010 | Ray ........... H04W 12/02 380/270 |
| 2010/0210147 A1 | 8/2010 | Hauser |
| 2010/0238083 A1 | 9/2010 | Malasani |
| 2010/0315307 A1 | 12/2010 | Syed et al. |
| 2010/0322219 A1* | 12/2010 | Fischer ........... H04B 7/0452 370/338 |
| 2011/0006956 A1 | 1/2011 | McCown |
| 2011/0028097 A1 | 2/2011 | Memik et al. |
| 2011/0044186 A1 | 2/2011 | Jung et al. |
| 2011/0103309 A1 | 5/2011 | Wang et al. |
| 2011/0111715 A1 | 5/2011 | Buer et al. |
| 2011/0170424 A1 | 7/2011 | Safavi |
| 2011/0172916 A1 | 7/2011 | Pakzad et al. |
| 2011/0194644 A1 | 8/2011 | Liu et al. |
| 2011/0243291 A1 | 10/2011 | McAllister et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0134280 A1 | 5/2012 | Rotvold et al. |
| 2012/0238201 A1 | 9/2012 | Du et al. |
| 2012/0314634 A1 | 12/2012 | Sekhar |
| 2013/0005350 A1 | 1/2013 | Campos et al. |
| 2013/0023216 A1 | 1/2013 | Moscibroda et al. |
| 2013/0128858 A1* | 5/2013 | Zou ........... H04W 72/0453 370/329 |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1* | 8/2013 | Li ........... H04W 72/085 370/329 |
| 2013/0271319 A1 | 10/2013 | Trerise |
| 2013/0288735 A1 | 10/2013 | Guo |
| 2013/0301438 A1 | 11/2013 | Li et al. |
| 2013/0322276 A1* | 12/2013 | Pelletier ........... H04W 72/085 370/252 |
| 2013/0322413 A1* | 12/2013 | Pelletier ........... H04W 72/1289 370/336 |
| 2014/0024328 A1 | 1/2014 | Balbien et al. |
| 2014/0051357 A1* | 2/2014 | Steer ........... H04L 63/0876 455/41.2 |
| 2014/0098748 A1 | 4/2014 | Chan et al. |
| 2014/0145890 A1 | 5/2014 | Ramberg et al. |
| 2014/0198867 A1 | 7/2014 | Sturkovich et al. |
| 2014/0206322 A1* | 7/2014 | Dimou ........... H04W 4/005 455/414.1 |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0253378 A1 | 9/2014 | Hinman |
| 2014/0253402 A1 | 9/2014 | Hinman et al. |

(56) References Cited

U.S. PATENT DOCUMENTS

| | | | |
|---|---|---|---|
| 2014/0254700 | A1 | 9/2014 | Hinman et al. |
| 2014/0256166 | A1 | 9/2014 | Ramos et al. |
| 2014/0320306 | A1 | 10/2014 | Winter |
| 2014/0320377 | A1 | 10/2014 | Cheng et al. |
| 2014/0355578 | A1 | 12/2014 | Fink et al. |
| 2014/0355584 | A1 | 12/2014 | Fink et al. |
| 2015/0002335 | A1 | 1/2015 | Hinman et al. |
| 2015/0015435 | A1 | 1/2015 | Shen et al. |
| 2015/0256275 | A1 | 9/2015 | Hinman et al. |
| 2015/0263816 | A1 | 9/2015 | Hinman et al. |
| 2015/0319584 | A1 | 11/2015 | Fink et al. |
| 2015/0325945 | A1 | 11/2015 | Ramos et al. |
| 2015/0327272 | A1 | 11/2015 | Fink et al. |
| 2015/0365866 | A1 | 12/2015 | Hinman et al. |
| 2016/0149635 | A1 | 5/2016 | Hinman et al. |

FOREIGN PATENT DOCUMENTS

| | | |
|---|---|---|
| EP | 002640177 | 2/2015 |
| WO | WO2014137370 | 9/2014 |
| WO | WO2014138292 | 9/2014 |
| WO | WO2014193394 | 12/2014 |
| WO | WO2015112627 | 7/2015 |

OTHER PUBLICATIONS

Non-Final Office Action, Aug. 25, 2014, U.S. Appl. No. 13/906,128, filed May 30, 2013.
Non-Final Office Action, Sep. 22, 2014, U.S. Appl. No. 14/045,741, filed Oct. 3, 2013.
Notice of Allowance mailed Sep. 8, 2015 in Chinese Design Patent Application 201530058063.8, filed Mar. 11, 2015.
Non-Final Office Action, Mar. 18, 2015, U.S. Appl. No. 14/183,375, filed Feb. 18, 2014.
International Search Report and Written Opinion of the International Search Authority mailed Jun. 29, 2015 in Patent Cooperation Treaty Application No. PCT/US2015/012285, filed Jan. 21, 2015.
Notice of Allowance, Aug. 19, 2015, U.S. Appl. No. 14/183,329, filed Feb. 18, 2014.
Final Office Action, Nov. 24, 2015, U.S. Appl. No. 14/183,375, filed Feb. 18, 2014.
Notice of Allowance, Oct. 26, 2015, U.S. Appl. No. 13/906,128, filed May 30, 2013.
Non-Final Office Action, Sep. 10, 2015, U.S. Appl. No. 14/198,378, filed Mar. 5, 2014.
Hinman et al., U.S. Appl. No. 61/774,632, filed Mar. 7, 2013.
First Official Notification mailed Jun. 15, 2015 in Chinese Design Patent Application 201530058063.8, filed Mar. 11, 2015.
Non-Final Office Action, Dec. 24, 2013, U.S. Appl. No. 14/045,741, filed Oct. 3, 2013.
Non-Final Office Action, Dec. 11, 2013, U.S. Appl. No. 13/906,128, filed May 30, 2013.
Final Office Action, Apr. 15, 2014, U.S. Appl. No. 13/906,128, filed May 30, 2013.
Non-Final Office Action, Jun. 16, 2014, U.S. Appl. No. 14/164,081, filed Jan. 24, 2014.
Final Office Action, Apr. 16, 2014, U.S. Appl. No. 14/045,741, filed Oct. 3, 2013.
Final Office Action, Mar. 23, 2015, U.S. Appl. No. 13/906,128, filed May 30, 2013.
Notice of Allowance, Jun. 3, 2015, U.S. Appl. No. 14/045,741, filed Oct. 3, 2013.
Non-Final Office Action, Sep. 17, 2015, U.S. Appl. No. 14/741,423, filed Jun. 16, 2015.
Notice of Allowance, Jan. 11, 2016, U.S. Appl. No. 29/502,253, filed Sep. 12, 2014.
International Search Report and Written Opinion of the International Search Authority mailed Nov. 26, 2013 in Patent Cooperation Treaty Application No. PCT/US2013/047406, filed Jun. 24, 2013.
International Search Report and Written Opinion of the International Search Authority mailed Aug. 9, 2013 in Patent Cooperation Treaty Application No. PCT/US2013/043436, filed May 30, 2013.
International Search Report and Written Opinion of the International Search Authority mailed Jul. 1, 2014 in Patent Cooperation Treaty Application No. PCT/US2014/020880, filed Mar. 5, 2014.
Non-Final Office Action, Jan. 5, 2015, U.S. Appl. No. 14/183,445, filed Feb. 18, 2014.
Non-Final Office Action, Jan. 15, 2015, U.S. Appl. No. 14/183,329, filed Feb. 18, 2014.
Non-Final Office Action, Jan. 2, 2015, U.S. Appl. No. 13/925,566, filed Jun. 24, 2013.
Notice of Allowance, Dec. 30, 2014, U.S. Appl. No. 14/164,081, filed Jan. 24, 2014.
Advisory Action, Mar. 2, 2016, U.S. Appl. No. 14/183,375, filed Feb. 18, 2014.
Notice of Allowance, Apr. 6, 2016, U.S. Appl. No. 14/198,378, filed Mar. 5, 2014.
Non-Final Office Action, Apr. 7, 2016, U.S. Appl. No. 14/639,976, filed Mar. 5, 2015.
Non-Final Office Action, Apr. 26, 2016, U.S. Appl. No. 14/802,829, filed Jul. 17, 2015.
Notice of Allowance, Aug. 16, 2016, U.S. Appl. No. 14/802,829, filed Jul. 17, 2015.
Non-Final Office Action, Sep. 15, 2016, U.S. Appl. No. 14/183,375, filed Feb. 18, 2014.

* cited by examiner

| | $T_n$ | $T_{n+1}$ | $T_{n+2}$ | $T_{n+3}$ | $T_{n+4}$ | $T_{n+5}$ |
|---|---|---|---|---|---|---|
| Terminal Device 1 105 | TX($f_1$) | RX($f_1$) | TX($f_1$) | RX($f_1$) | TX($f_1$) | RX($f_1$) |
| Terminal Device 2 110 | RX($f_1$) | TX($f_1$) | RX($f_1$) | TX($f_1$) | RX($f_1$) | TX($f_1$) |

*FIG. 2*

CHANNEL OPTIMIZATION IN HALF DUPLEX COMMUNICATIONS SYSTEMS

CROSS-REFERENCE TO RELATED APPLICATIONS

This non-provisional patent application claims the benefit of, and is a continuation of, U.S. patent application Ser. No. 14/164,081 filed on Jan. 24, 2014, entitled "CHANNEL OPTIMIZATION IN HALF DUPLEX COMMUNICATIONS SYSTEMS" that issued as U.S. Pat. No. 9,001,689 on Apr. 7, 2015—all of which are hereby incorporated by reference herein in their entirety including all references cited therein.

FIELD OF THE TECHNOLOGY

Embodiments of the disclosure relate to the wireless radio systems. More specifically, but not by way of limitation, the present technology includes dynamic channel selection in a half-duplex (HDX) mode with explicit radio frequency (RF) spectrum feedback from a remote device, which allows a local device to select a Modulation and Coding Scheme (MCS) that maximizes the throughput and improves link reliability.

BACKGROUND OF THE DISCLOSURE

Carrier sensing, which is a fundamental medium access protocol for IEEE 802.11 Distributed Coordination Function (DCF) devices, may function poorly when the RF environment at the transmitter and receiver are vastly different. For example, a terminal such as a transmitter begins sending a frame after determining a medium is free, but high interference and noise levels at the receiver may cause the frame to be received erroneously at the intended receiving terminal. Retransmission of the same data may degrade link throughput even further. The exchange of Request-To-Send (RTS) and Clear-To-Send (CTS) frames before sending of the data frames is intended to mitigate this problem. However, the sending of RTS and CTS frames for every data frame is inefficient particularly for wireless links, and even further over large distances, leading to long transmission latency.

Another problem with an IEEE 802.11 DCF based medium access protocol is that it requires terminal devices on both sides of a wireless link to operate on the same channel for transmissions and receptions since a Clear Channel Assessment (CCA) needs to be performed before any frame exchange sequences can be initiated. In a congested RF environment, there may be no single frequency band available for the wireless link. In addition, when the transmitter and receiver are separated by a long distance their respective local radio environments are likely to be significantly different, further reducing the likelihood of a single frequency band being optimal for both the forward and reverse wireless links.

SUMMARY OF THE DISCLOSURE

According to some embodiments, the present technology may be directed to a method for transmitting data between network devices using channel optimization in half duplex communications. The method may include: (a) obtaining at a first terminal, radio frequency (RF) spectral information local to the first terminal; (b) analyzing at the first terminal, RF spectral information for a second terminal that is not co-located with the first terminal; (c) transmitting data to the second terminal on a second terminal optimal frequency band; and (d) receiving data from the second terminal on the first terminal optimal frequency band, the first terminal optimal frequency being based upon the RF spectral information local to the first terminal.

According to other embodiments, the present technology may be directed to a network coordinator for a network using time division duplexing or time division multiple access. The network coordinator may include: (a) a processor; and (b) a memory for storing executable instructions, the processor executing the instructions to perform operations comprising: (i) establishing a wireless link with a plurality of terminal devices; (ii) receiving from the plurality of terminal devices, radio frequency (RF) spectral information; (iii) exchanging RF spectral information between the plurality of terminal devices; and (iv) negotiating a frequency band for each of the plurality of terminal devices such that a product or a sum of a forward link and a reverse link throughput for each plurality of terminal devices is jointly maximized on the wireless link, the forward and reverse link throughput being determined from an analysis of the radio frequency (RF) spectral information for the plurality of terminal devices.

According to additional embodiments, the present technology may be directed to a dual channel network device, comprising: (a) a time division duplexing interface for transmitting or receiving data on a first channel; (b) a time division duplexing and frequency division duplexing interface for transmitting or receiving data on a second channel; (c) a processor; and (d) a memory for storing executable instructions, the processor executing the instructions to perform operations comprising: (i) determining radio frequency (RF) spectral information local to the device; (ii) selecting at the device an optimal frequency band for the first channel based upon the RF spectral information; (iii) selecting at the device an optimal frequency band for the second channel based upon the RF spectral information; (iv) transmitting management frames that include the optimal frequency band for the first channel and the optimal frequency band for the second channel to one or more additional devices on a network; and (v) receiving data from the one or more devices on either of the first and second channels.

According to additional embodiments, the present technology may be directed to a terminal device having (a) a processor; and (b) a memory for storing executable instructions, wherein execution of the instructions causes the processor to: (i) determine radio frequency (RF) spectral information local to the terminal device; (ii) analyze spectral information for one or more additional terminals in a network that are not co-located with the first terminal; (iii) determine an optimal frequency band for each of the one or more additional terminals; (iv) transmit data to the one or more additional terminals using the optimal frequency bands; and (v) receive data from the one or more additional terminals on a device optimal frequency band that is based upon the RF spectral information local to the terminal device.

According to other embodiments, the present technology may be directed to a non-transitory computer readable storage media that includes instructions for transmitting data between network devices using channel optimization in half duplex communications. The method may include: (a) obtaining at a first terminal, radio frequency (RF) spectral information local to the first terminal; (b) analyzing at the first terminal, RF spectral information for a second terminal that is not co-located with the first terminal; (c) transmitting data to the second terminal on a second terminal optimal frequency band; and (d) receiving data from the second terminal on the first terminal optimal frequency band, the first terminal optimal frequency being based upon the RF spectral information local to the first terminal.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 illustrates two terminal devices communicating together using a pure Time Division Duplexing (TDD) mode of operation;

DETAILED DESCRIPTION

Figure 1A:
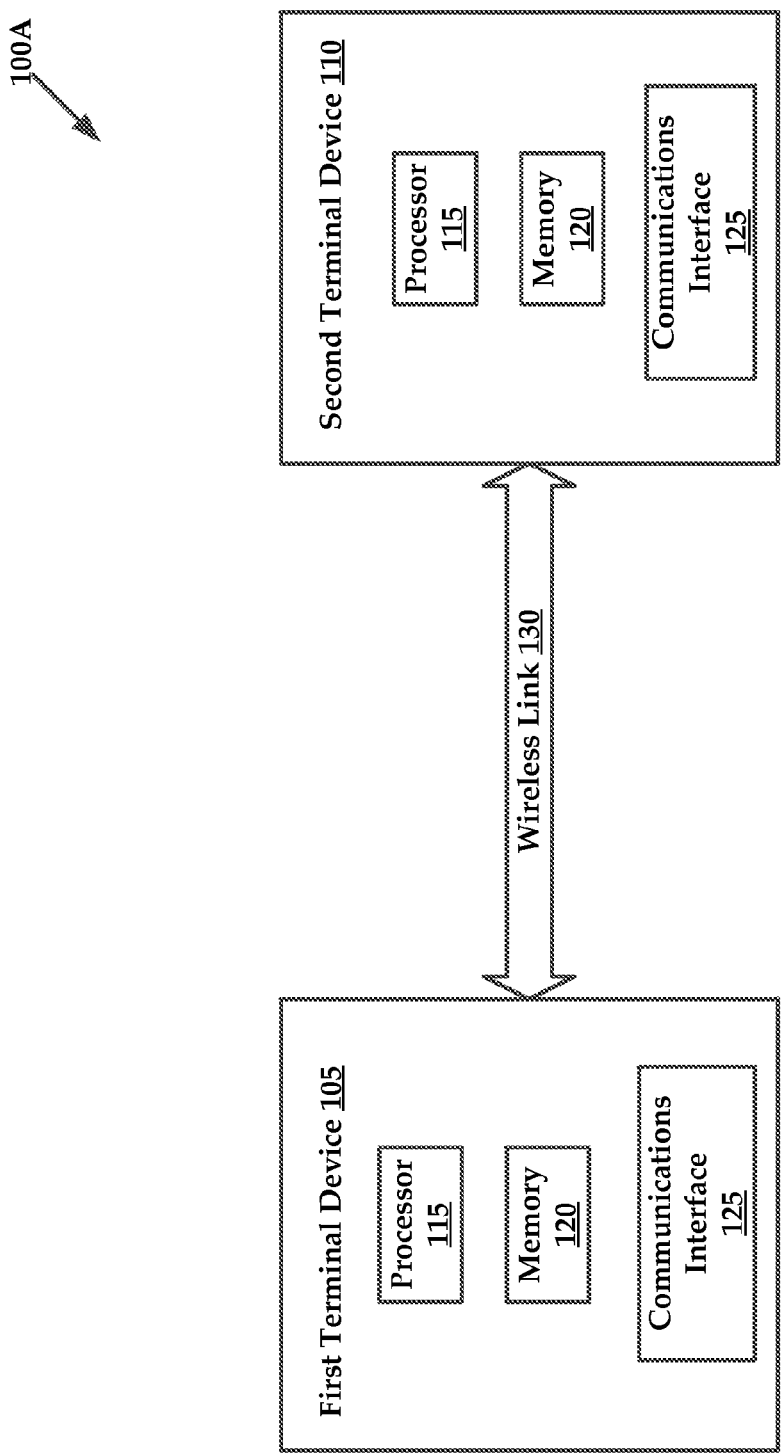
FIG. 1A is an exemplary wireless network, constructed in accordance with the present disclosure.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Generally, the present disclosure relates to optimal, dynamic channel selection in a wireless network, where devices operate in a HDX mode with explicit RF spectrum feedback for terminal devices. RF spectrum feedback allows the terminal devices to select a Modulation and Coding Scheme (MCS) that maximizes the throughput and improves wireless link reliability. These features reduce or eliminate the possibility of hidden terminals and the inadequacy with carrier sensing for wireless links with longer distance. These methodologies are particularly advantages in wireless links of long distance. In addition, dynamic channel selection allows for adaptation within wireless links in response to local changes in the wireless medium and the physical surroundings, allowing continued optimal communications in light of these changes.

The decoupling and use of different frequency bands for transmission and reception allows the overall throughput to be further optimized, since the RF spectrum can be vastly different and/or congested on both sides of a wireless link(s). In such situations, a reasonably good frequency band may not be available for pure TDD or TDMA mode of operation. When terminal devices can select a different frequency band for both transmit and receive communications, the selection of frequency band(s) may maximize throughput in both directions. Furthermore, this also increases reliability of the wireless link, since it is less probable that a potential interferer may overlap both frequency bands for transmit and receive at the same time.

The present technology contemplates various systems that dynamically select the operating frequency band(s) for transmission or reception of radio signals for half-duplex (HDX) communications. The choice of frequency band(s) used for transmission or reception of radio signals can be identical or different. By exchanging locally measured Radio Frequency (RF) spectra, a device on either side of the wireless link can dynamically select operating frequency band(s) for transmission and reception of radio signals that maximizes the overall link throughput and reliability.

It will be understood that devices in a HDX (half duplex) wireless system are provisioned with non-overlapping periods of time for transmission of radio signals. These can be based on Time Division Duplex (TDD) for point-to-point systems or Time Division Multiple Access (TDMA) for point-to-multipoint systems. The start and duration of each transmission period can be signaled to the device in three different ways, such as carrier sensing, token passing between devices, or coordinated by an external entity (e.g., GPS clock, master device, etc.).

Each terminal device measures its local RF spectra, either on a periodic time interval, or when triggered by a loss of signal quality, or upon the request of a remote device, such as another terminal device or a network coordinator. A terminal device then either sends local raw RF spectra information, or the preferred frequency band(s) for reception of radio signals information to the opposing terminal device. A terminal device may select an optimal frequency band for transmissions either based on the raw RF spectra information received, or adopt the preferred frequency band(s) indicated. On each terminal device, the choice of frequency band(s) for transmission or reception of radio signals is selected separately based on the frequency band(s) that maximizes link throughput; as a result, different frequency band(s) can be selected for transmission and reception.

Figure 4:
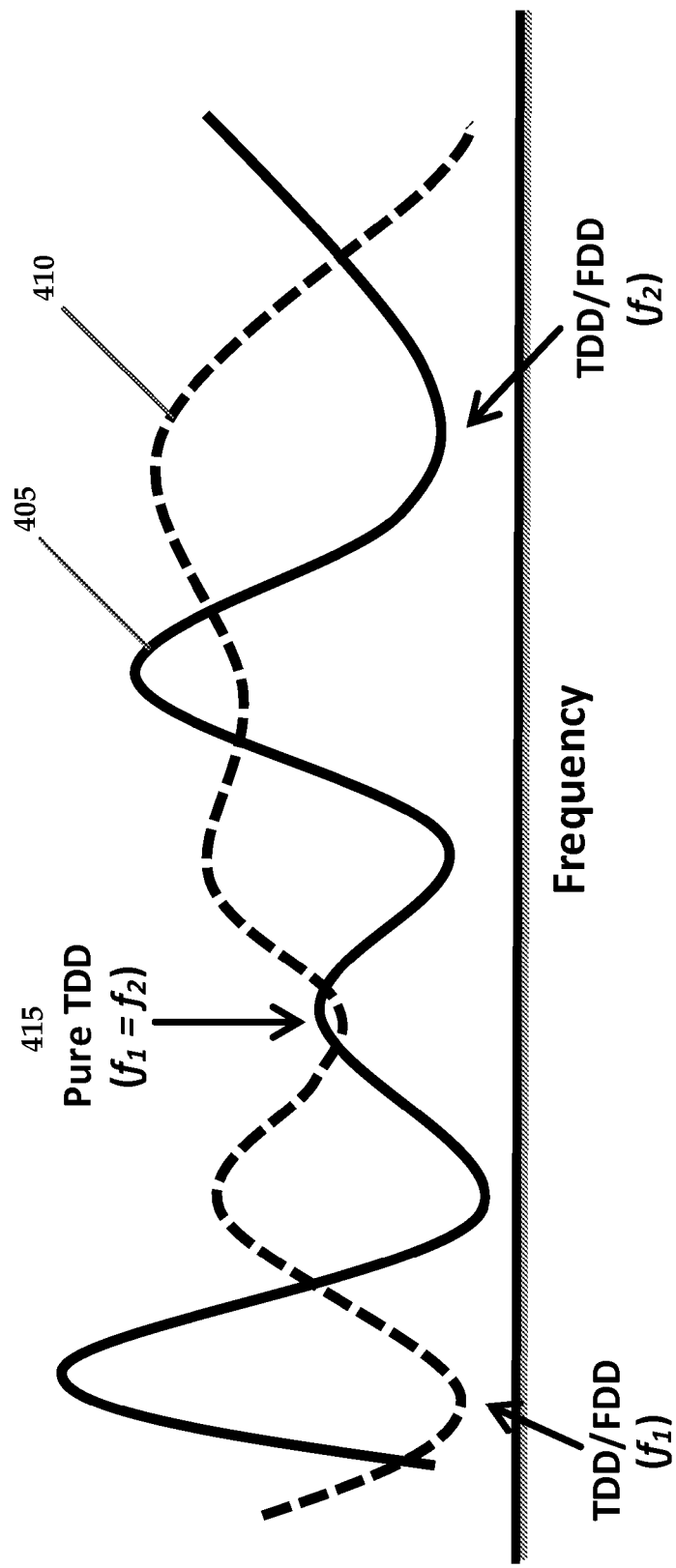
FIG. 4 is a graphical representation of local terminal and remote terminal RF spectrum profiles.

For pure TDD or TDMA modes of operation, a frequency band is selected such the product of the forward and reverse link throughput is maximized. See FIG. 4 for selected frequency bands for both remote and local (e.g., first and second) terminal device, which illustrate a pure TDD mode of operation. A first optimal frequency band 405 is illustrated for a first terminal 105 as well as a second optimal frequency band 410 is illustrated for a second terminal 110. It is noteworthy that the optimal frequency bands for both the first and second terminals 105 and 110 change over time, as indicated by the trend lines. In time periods where the first and second optimal frequency bands coincide, such as during interval 415, the terminal devices may operate in a pure TDD mode. It is also noteworthy that both the first and second terminals 105 and 110 are utilizing a TDD/FDD mode of operation, where both terminals are configured to utilize both time division and frequency division. Thus, when the optimal frequencies for the devices coincide, there is only a need for the devices to perform time division with their communications. That is, the terminals are both operating optimally on the same channel/frequency.

Another problem with an IEEE 802.11 DCF based medium access protocol is that it requires terminal devices on both sides of a wireless link to operate on the same channel for transmissions and receptions since a clear channel assessment (CCA) needs to be performed before any frame exchange sequences can be initiated. In a congested RF environment there may be no single frequency band available for the wireless link.

DEFINITIONS AND TERMS

A Time Division Duplex (TDD) wireless system is a point-to-point system comprising of a pair of terminal devices that can send radio signals and communicate with each other in both directions. Only one terminal device can transmit a radio signal at any one time.

A Time Division Multiple Access (TDMA) wireless system is a point-to-multipoint system comprising a group of terminal devices that can send radio signals and communicate with one another. Only one terminal device can transmit a radio signal at any one time.

A transmission period is defined as duration of time where a terminal device in a TDD or TDMA systems transmits a radio signal. The start and duration of each transmission period can be indicated to the terminal device by carrier sensing, token passing between devices, or coordinated by an external entity (e.g., GPS, master device, etc.).

A network coordinator coordinates and schedules transmission periods and frequency bands for all transmission and reception of radio signals in a wireless network. This function can be physically located in a single device or distributed across several devices, such as the terminal devices of a wireless network.

A pure TDD or TDMA mode of operation is when terminal devices communicate wirelessly with one another in transmission periods indicated, and the operating frequency bands for transmission and reception of radio signals are identical. Exemplary pure TDD or TDMA operations are illustrated in FIG. 2. A terminal device 105 transmits and receives during opposing transmission periods from a second terminal device 110, using the same frequency f1.

Figure 3:
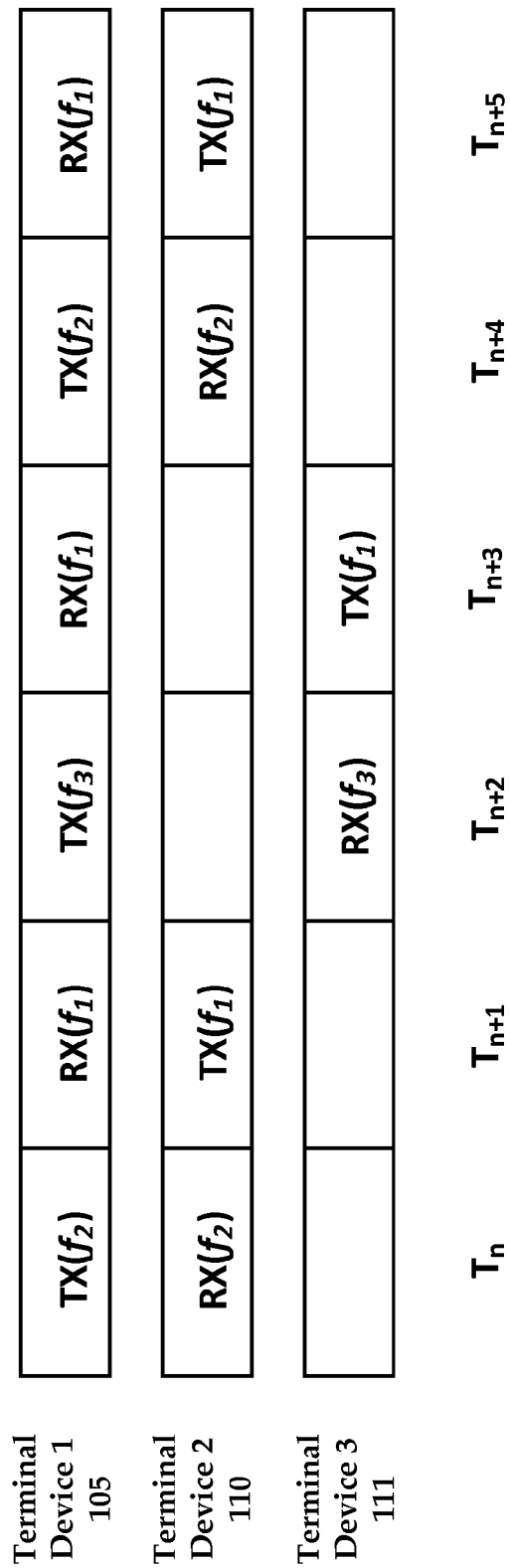
FIG. 3 illustrates three terminal devices communicating with one another using Time Division Multiple Access (TDMA) and Frequency Division Duplexing (FDD) mode of operation.

A TDD/FDD (Frequency Division Duplex) or TDMA/FDD mode of operation is when terminal devices communicate wirelessly with one another in the indicated transmission periods, and the operating frequency bands for transmission and reception of radio signals can be different. An example of pure TDD/FDD or TDMA/FDD operations is illustrated in FIG. 3. Terminal devices 105, 110, and 111, each transmit and receive signals according to the arrangement provided. It is noteworthy that for each transmit and receive transmission period, two of the three terminal devices may communicate with one another on a particular frequency band.

A RF spectrum scan is a system process where a first terminal periodically measures the local RF spectrum over the all available frequency bands, and generates a measurement report that is then sent to a second (or more) terminal. Alternatively, the first terminal may use the measurement report to select a preferred frequency band(s), and send this preference to the second terminal.

The terms terminal or terminal device may be used interchangeably herein, and may include, for example, an RF radio, such as a wireless transceiver, a User Equipment or communications device, such as cellular telephone, or any other device that is capable of transmitting or receiving RF signals that would be known to one of ordinary skill in the art with the present disclosure before them.

FIG. 1A illustrates an exemplary network 100A that includes network devices. In this embodiment, the network devices include a first terminal 105 and a second terminal 110. It will be understood that the first and second terminal devices 105 and 110 may be constructed similarly to one another. In other instances, the first and second terminal devices may be dissimilar to one another, although both the first and second terminal devices 105 and 110 may both include a processor 115 and a memory 120 for storing executable instructions. The executable instructions that are stored in memory 120 may be executed by the processor 115 to perform one or more of the various methods of channel optimization as described herein. Also, each of the devices includes a communications interface 125 that interfaces with a wireless link 130 that communicatively couples the first and second terminal devices 105 and 110.

Figure 5:
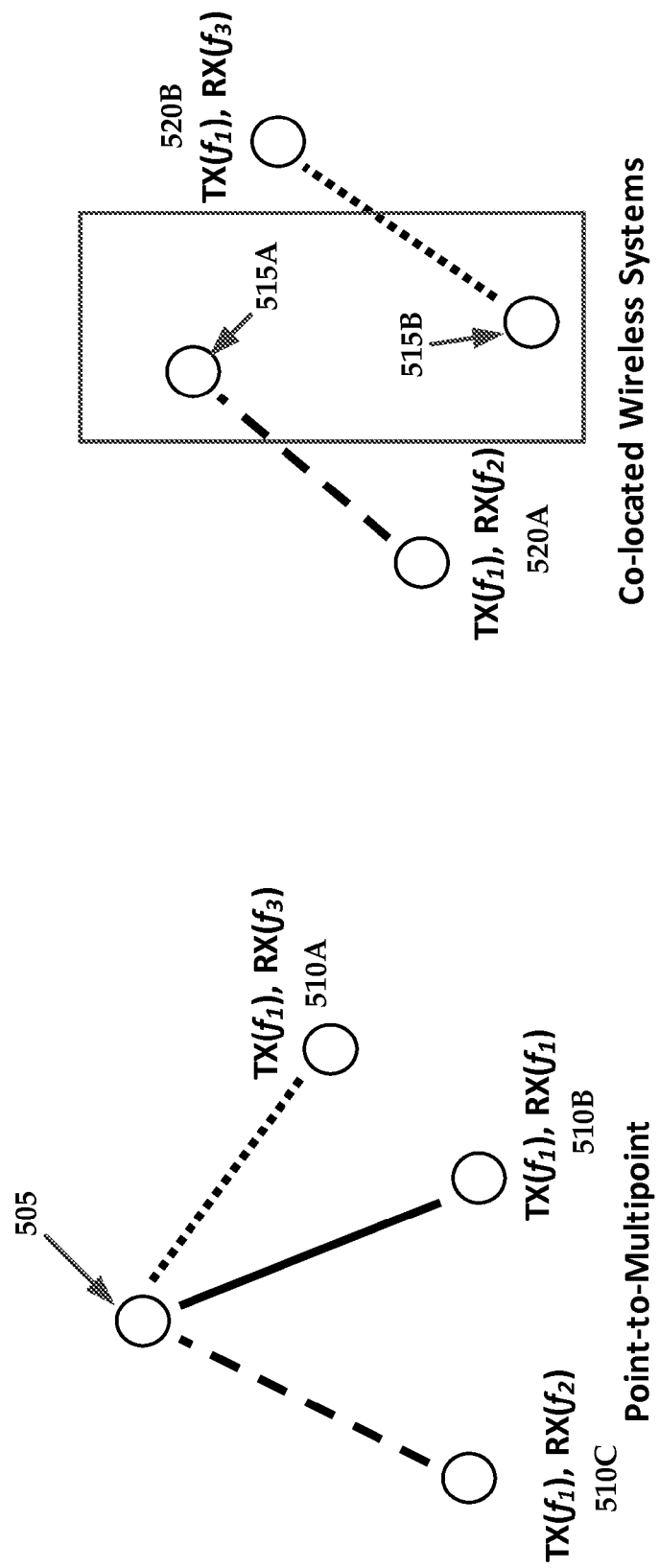
FIG. 5A illustrates an exemplary wireless system comprising a point-to-multipoint arrangement of network terminals, having a hybrid TDMA/FDD network topology.
FIG. 5B illustrates an exemplary wireless system comprising co-located arrangement of network terminals, having a hybrid TDMA/FDD network topology.

While FIG. 1A illustrates a first and second terminal devices 105 and 110, the network 100A may include any number of terminal devices. As will be described herein, the network may include a point-to-multipoint arrangement of terminal devices or an arrangement of terminal devices where a portion of the terminal devices are co-located with one another (see FIGS. 5A and 5B).

Spectrum Monitoring

Each of the terminal devices 105 and 110 performs a RF spectrum scan of their local RF spectrum periodically for any of: (a) received Signal to Noise Ratio (SINR), (b) Error Vector Magnitude (EVM), (c) interference plus noise power spectrum, and (d) overlapping Basic Service Set (OBSS) traffic activity. The measurement for these parameters, with the exception of OBSS traffic activity, can be performed in any frequency bands permitted by local regulatory rules. For OBSS activity, measurement may occur by monitoring a count of beacons or any IEEE 802.11 frames in each of the IEEE 802.11 channels.

Figure 1B:
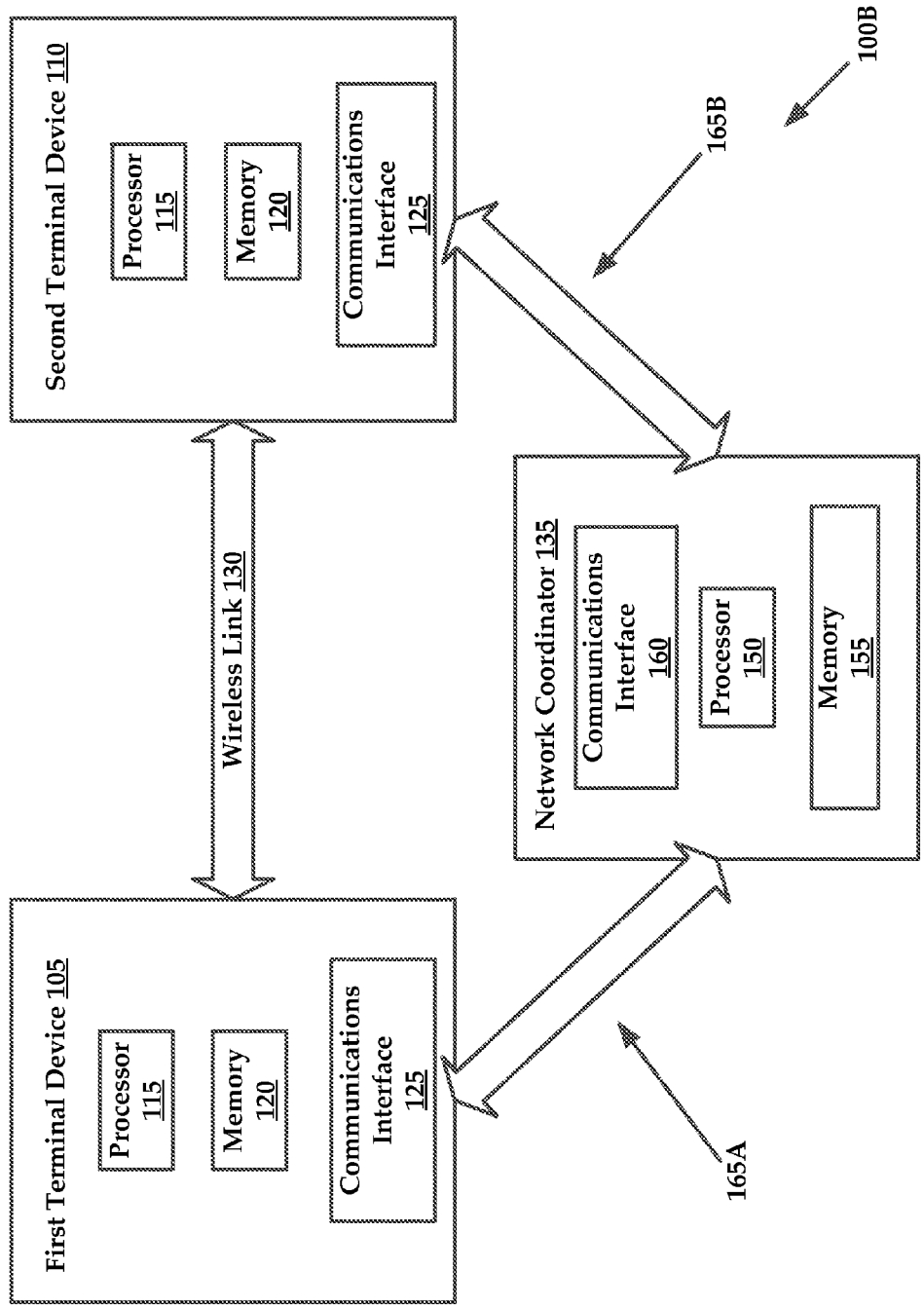
FIG. 1B is another exemplary wireless network, constructed in accordance with the present technology.

Alternatively, a terminal device may process the RF spectra information locally, select a preferred frequency band(s) for reception of radio signals, and communicate that information to one or more terminal devices or a network coordinator 135 (see FIG. 1B).

This feedback report can include either the raw RF spectra information, or the preferred frequency band(s) for reception of radio signals. In some embodiments, the feedback information may be encapsulated in proprietary management frame(s) and sent over an established wireless link to remote peer terminal devices at a periodic time interval, or when triggered by degradation in link quality, or upon the request by a remote peer terminal device.

Dynamic Channel Selection

As discussed in the overview section, the RF spectra can be vastly different and/or congested on both sides of a wireless link. As will be described in greater detail below, empirical data illustrating the widely varying nature of RF spectral data for terminal devices, taken from actual measurements at two locations will be provided in graphical format in FIGS. 11-13.

For pure TDD or TDMA modes of operation, a frequency band is selected such the product of the forward and reverse link throughput is maximized. See FIG. 4 for selected frequency bands for both remote and local (e.g., first and second) terminal device, which illustrate a pure TDD mode of operation. A first optimal frequency band 405 is illustrated for a first terminal 105 as well as a second optimal frequency band 410 is illustrated for a second terminal 110. It is noteworthy that the optimal frequency bands for both the first and second terminals 105 and 110 change over time, as indicated by the trend lines. In time periods where the first and second optimal frequency bands coincide, such as during interval 415, the terminal devices may operate in a pure TDD mode. It is also noteworthy that both the first and second terminals 105 and 110 are utilizing a TDD/FDD mode of operation, where both terminals are configured to utilize both time division and frequency division. Thus, when the optimal frequencies for the devices coincide, there is only a need for the devices to perform time division with their communications. That is, the terminals are both operating optimally on the same channel/frequency.

For TDD/FDD or TDMA/FDD mode of network operation, a frequency band may be selected such that the sum of the forward and reverse link throughput is maximized. In other words, a local (first) terminal device selects a frequency band for transmission such that the interference plus SNIR at the remote (second) terminal device is minimized or equivalently to maximizing the received SINR. Also in this mode, the selection of frequency band used for transmission at both sides of the wireless link can be performed independently from one another. Advantageously, the frequency bands for both the terminal devices are not required to be identical to one another. A terminal device in this mode of operation will be transmitting a frame at one frequency band, and receiving a frame at a different frequency band.

Advantageously, a mode of operation where TDD is overlaid with FDD capabilities provides unique modes of operation for devices that are inherently limited. For example, most wireless radios are not designed to perform FDD modes of operation. Most of these devices are inherently half duplex devices and are not configured for full duplex operations. Full duplex radio creation is significantly more expensive than that of half-duplex radios. Endowing half-duplex radio with the ability to layer an FDD mode of operation onto its inherent TDD mode will provide interference mitigation due to use of FDD modes, while the radio may operate in TDD modes, when appropriate, to reduce operating cost.

Referring to FIG. 1B, which illustrates an exemplary network 100B for practicing aspects of the present technology. In some embodiments, the network 100B includes a network coordinator 135 that can establish wireless links, such as wireless link 130 with one or more remote terminal devices. The network 100B may operate in a TDMA/FDD mode. More specifically, the network coordinator 135 exchanges local RF spectrum information with each remote terminal device. This feedback information can include either the raw RF spectra information, or the preferred frequency band(s) for reception of radio signals. Using this feedback information, the network coordinator 135 negotiates with each group of remote terminal devices the frequency band(s) for transmission and reception of radio signals that maximizes throughput and link reliability.

Generally, the network coordinator 135 may include a processor 150 and a memory 155 for storing executable instructions. The processor 150 executes the instructions stored in the memory 155 to perform various methods for establishing wireless links between terminal devices, where the wireless links are configured for optimal/maximum throughput using the channel optimization techniques described herein. The network coordinator 135 may also include a communications interface 160, such as an RF interface (i.e., an RF antenna and associated hardware) that communicatively couples the network coordinator 135 with the first and second terminal devices 105 and 110. In some instances, the network coordinator 135 may be individually coupled to the terminal devices with separate wireless links 165A and 165B, respectively.

It is noteworthy that a network coordinator 135 may include a terminal device that establishes an ad-hoc wireless network with one or more remote terminal devices. In other instances, the network coordinator 135 may include a centralized network device, such as a Call Session Control Function (CSCF) or service within a communications system that acts as a communications intermediary between remote terminal devices.

See FIGS. 5A and 5B for examples of TDMA/FDD network topologies. In detail, FIG. 5A illustrates a first terminal device 505, which is coupled with a plurality of remote terminal devices 510A-C. After the RF spectrum analysis and exchange process, the first terminal device 505 is configured to receive signals from each of the plurality of remote terminal devices 510A-C on a first optimal frequency band TX(f1), while transmitting signals to each of the remote terminal devices using a unique optimal frequency band. For example, the first terminal device 505 transmits to the remote terminal device 510A on a frequency RX(f3), while transmitting to another remote terminal device 510B on a frequency RX(f1), and yet another remote terminal device 510C on a frequency RX(f2).

In FIG. 5B, two terminal devices 515A and 515B are co-located with one another, meaning that the two terminal devices 515A and 515B share similar RF spectral information. Thus, remote terminal devices 520A and 520B can transmit to the two terminal devices 515A and 515B using the same frequency TX(f1). The two terminal devices 515A and 515B may include co-located radios in a Multiple Input Multiple Output (MIMO) radio system.

Channel selection can be triggered dynamically by a terminal device (either local or remote) with the availability of a new measurement report, or degradation in throughput performance beyond a threshold in the current frequency band. For example, if a sum of local interference plus SINR indicates a reduction in throughput that is greater than 60%, a request for an updated RF spectral scan may be requested. When a more optimal frequency band is found, channel switch is achieved by a repeated exchange of management frames between terminal devices to coordinate and schedule a channel switch at an indicated time in the future. RF spectrum monitoring and dynamic channel selection continues to run throughout the existence of the wireless link.

Link Setup

A system of networked terminal devices operate in HDX mode either by carrier sensing, token passing or coordinated by an external entity to explicitly indicate transmission periods. Terminal devices communicate wirelessly with one another using these transmission periods. The system can be a point-to-point wireless link between two devices, or a point-to-multipoint wireless network with a group of devices (see FIGS. 5A and 5B). The negotiation to establish pure TDD or TDD/FDD modes of operation is achieved by an exchange of proprietary management frames between participating devices.

After establishing the mode of operation, participating terminal devices start the transfer of data frames in a HDX manner. In each transmission period, only the terminal device assigned to that transmission period is permitted to transmit a radio signal on an assigned, optimal frequency band. The intended receiving terminal device (or devices) of this radio signal switches to the frequency band at the start of the assigned transmission period in anticipation of this radio signals. For pure TDD or TDMA mode of operation, terminal devices on both sides of the wireless link use the same frequency band for transmission of radio signals, as described above. For TDD/FDD or TDMA/FDD modes of operation, terminal devices on both sides of a wireless link may use a different frequency band for transmission of radio signals.

Figure 6:
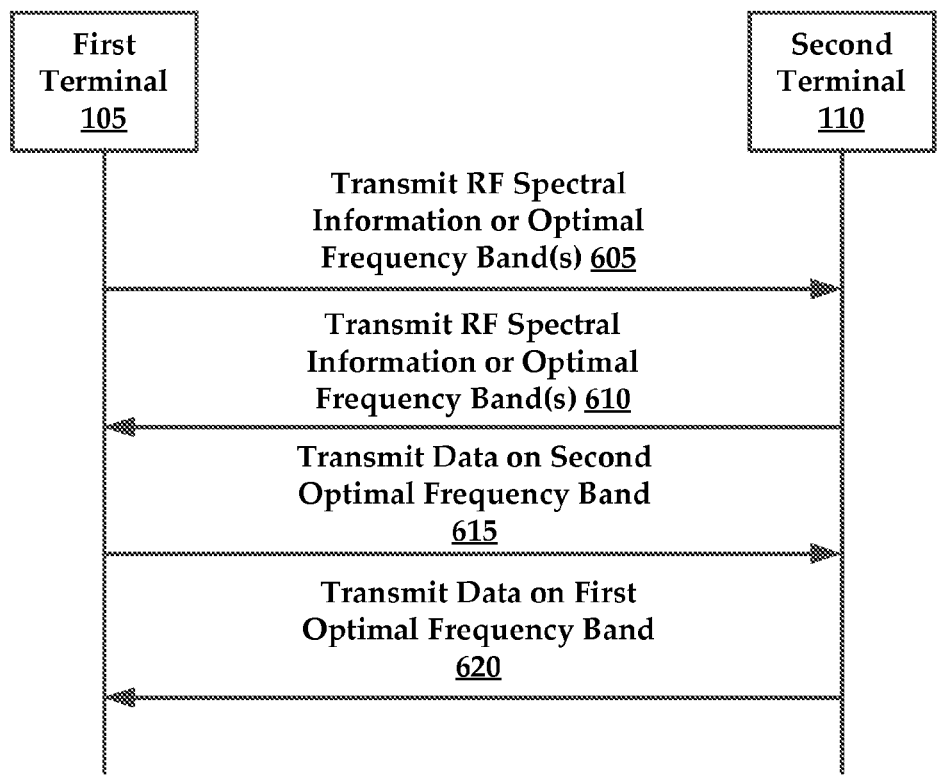
FIG. 6 is a signal flow diagram illustrating a channel optimization method executed between two terminals of a wireless network.

FIG. 6 is a signal flow diagram of an exemplary optimal frequency band exchange process and subsequent data transfer using the established optimal frequency bands for a first terminal 105 and a second terminal 110. Again, the first terminal 105 may transmit 605 either local RF spectral information to or desired optimal frequency band(s) to the second terminal 110. If the RF spectral information is transmitted, the second terminal 110 advantageously determines a first optimal frequency band(s) for the first terminal 105. The same process 610 is conducted for the second terminal 110 to determine a second optimal frequency band. Once the optimal frequency bands have been established, the first terminal 105 transmits 615 signals to the second terminal 110 on one or more of the second optimal frequency bands, while the second terminal 110 transmits 620 signals to the first terminal 105 on one or more of the first optimal frequency bands.

Figure 7:
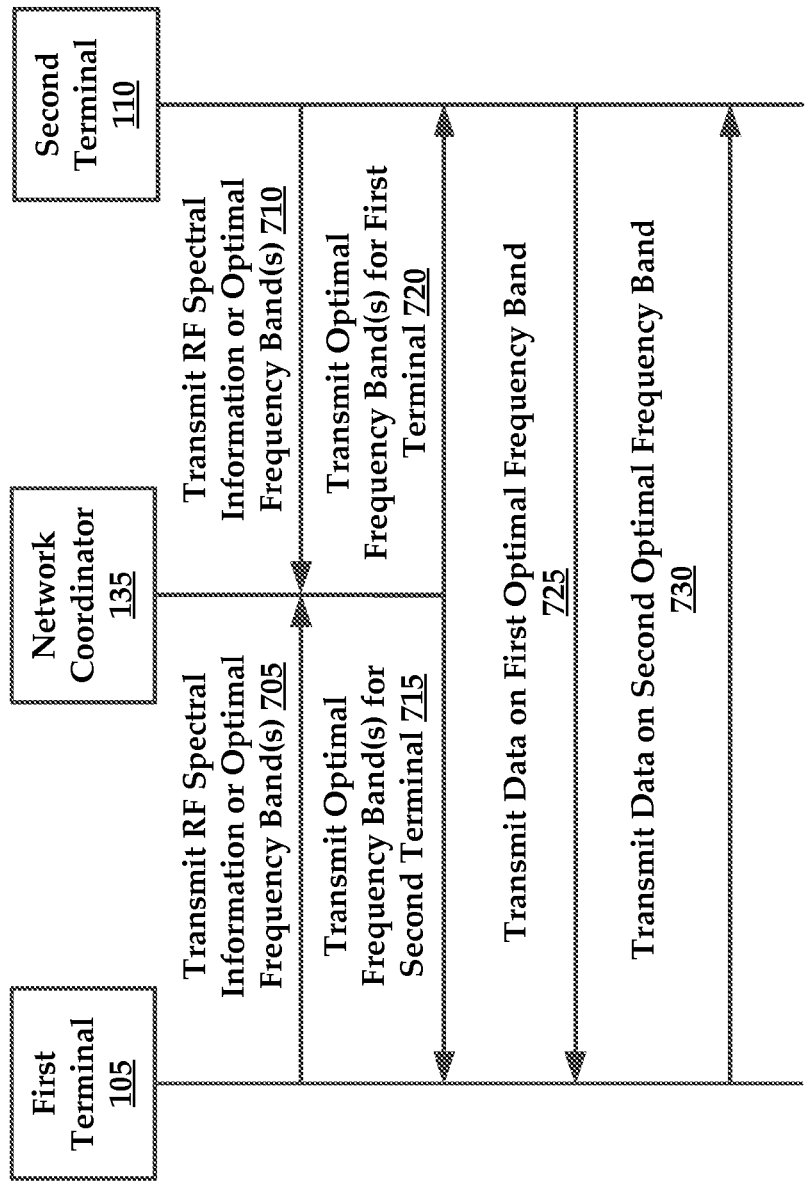
FIG. 7 is a signal flow diagram illustrating a channel optimization method executed by a network coordinator, mediating communications between two terminals of a wireless network.

FIG. 7 is a signal flow diagram for a network arrangement having a first terminal 105, a second terminal 110, and a network coordinator 135. Again, the network arrangement may include any number of terminals. Also, the network coordinator 135 and the first and second terminals may be similarly configured devices, such as cellular telephones, RF radios, or other devices configured to transmit and receive data on a wireless link.

The network coordinator 135 is tasked with establishing the wireless link between the first terminal and the second terminal 110 (see FIG. 1B).

In this embodiment, both the first and second terminals 105 and 110 transmit (705 and 710) their respective RF spectral information or desired operating frequency band(s) to the network coordinator 135. Next, the network coordinator 135 negotiates a frequency band for each of the terminals such that a product or a sum of a forward link and a reverse link throughput for each plurality of terminal devices is jointly maximized on the wireless link. The forward and reverse link throughput is determined from an analysis of the radio frequency (RF) spectral information for the plurality of terminal devices.

The network coordinator 135 then transmits (715 and 720) to each terminal device, an optimal frequency band(s) for the other terminal devices in the network. In this example, the first terminal 105 receives an optimal frequency band for the second terminal 110 and the second terminal 110 receives an optimal frequency band for the first terminal 105.

Once the optimal frequency bands have been disseminated, the second terminal 110 transmits 725 signals to the first terminal 105 on one or more of the optimal frequency bands, while the first terminal 105 transmits 730 signals to the second terminal 110 on one or more of the optimal frequency bands.

Figure 8:
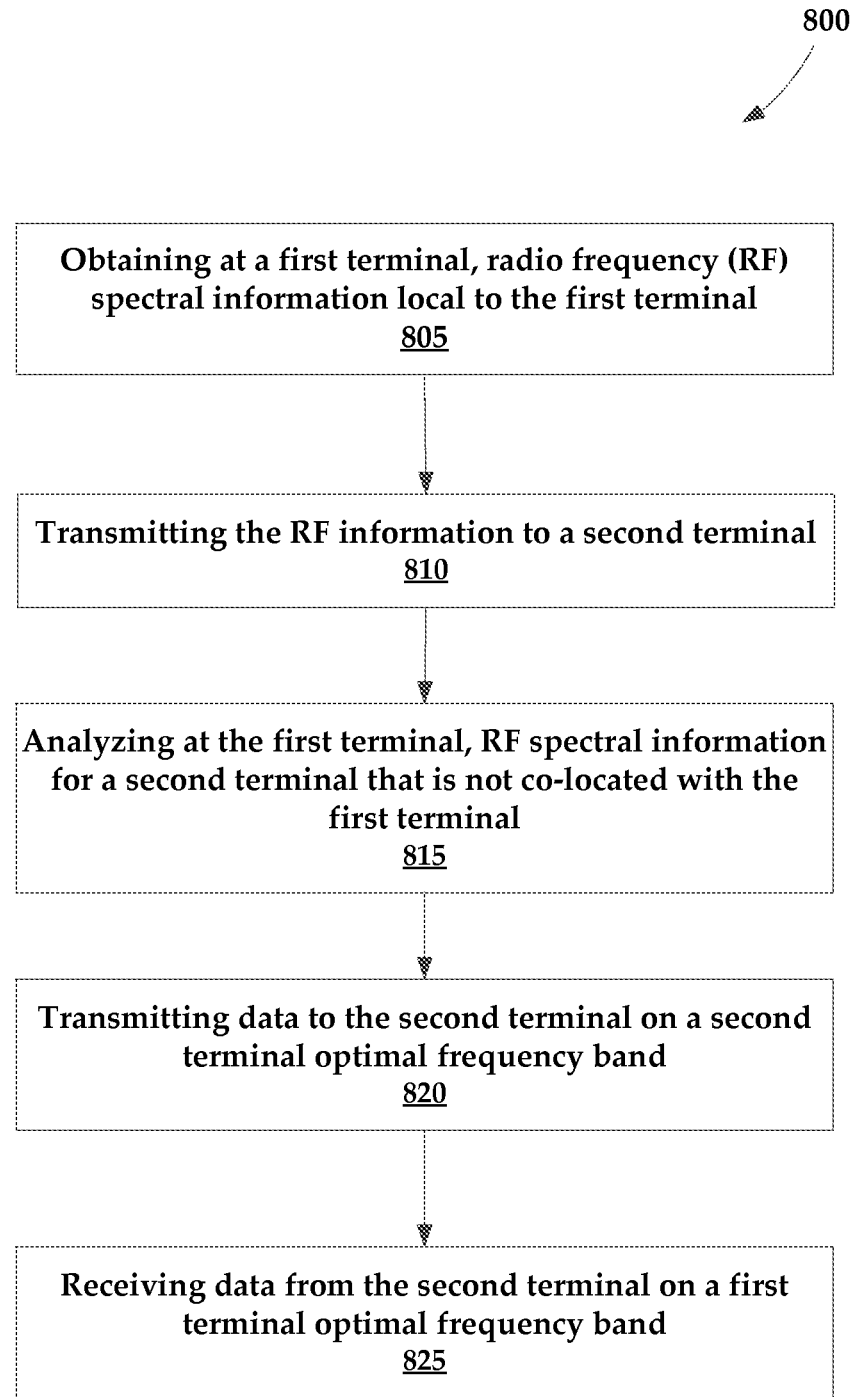
FIG. 8 is an exemplary method for transmitting data between network devices using channel optimization in half duplex communications.

FIG. 8 is a flowchart of an exemplary method 800 for transmitting data between network devices using channel optimization in half duplex communications. It will be understood that a first and second terminal are network devices, and more specifically, the first and second terminals are not co-located with one another. Again, when the terminals are not co-located, the RF spectral information for these terminals may be different from one another due to interference, SINR, or any of the other throughput mitigating factors described herein.

Initially, the method 800 includes obtaining 805 at a first terminal, radio frequency (RF) spectral information local to the first terminal. This may include scanning the local area for RF spectral information.

The method 800 also includes an optional step of transmitting 810 the RF information to a second terminal. The second terminal may process this RF spectral information for the first terminal to determine a first optimal frequency band for the first terminal. This step 810 is optional because the first terminal may analyze its own RF spectral information and select one or more preferred frequency bands. These bands may be placed in a ranked ordered list according to interference plus noise information for each band, and transmitted to the second terminal.

The method 800 also includes analyzing 815 at the first terminal, RF spectral information for a second terminal that is not co-located with the first terminal. The first terminal may select a second terminal optimal frequency band for the second terminal. Next, the method 800 includes transmitting 820 data to the second terminal on a second terminal optimal frequency band, as well as receiving 825 data from the second terminal on a first terminal optimal frequency band. Again, the first terminal optimal frequency may be based upon the RF spectral information local to the first terminal.

Figure 9:
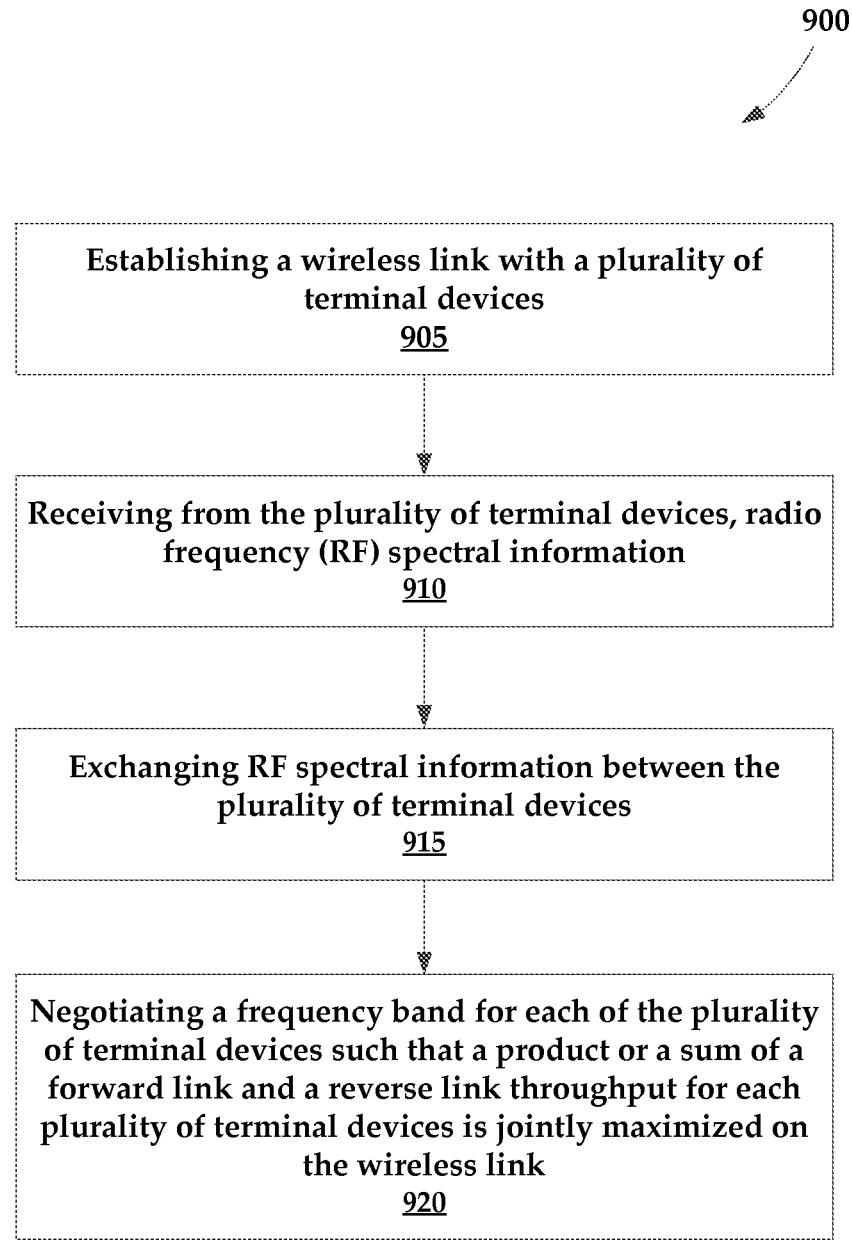
FIG. 9 is an exemplary method for transmitting data between network devices using channel optimization in half duplex communications.

FIG. 9 is a flowchart of an exemplary method 900 for transmitting data between network devices using channel optimization in half duplex communications. The method is preferably executed by a network coordinator, which may include an intermediary network device that communicates with a plurality of terminal devices. Also, the network coordinator may include one of a plurality of terminal devices that form a network.

The method 900 includes establishing 905 a wireless link with a plurality of terminal devices. After establishing the wireless link, the method includes receiving 910 from the plurality of terminal devices, radio frequency (RF) spectral information. Also, the method 900 includes exchanging 915 RF spectral information between the plurality of terminal devices.

In some instances, the method 900 includes negotiating 920 a frequency band for each of the plurality of terminal devices such that a product or a sum of a forward link and a reverse link throughput for each plurality of terminal devices is jointly maximized on the wireless link. Again, the forward and reverse link throughput is determined from an analysis of the radio frequency (RF) spectral information for the plurality of terminal devices.

In some instances, the network coordinator negotiates an optimal frequency band for each terminal by analyzing all of the RF spectral data for the terminals. The network coordinator would then transmit to each terminal, the optimal frequency for the other terminals in the network. Further, this information would include the optimal receiving frequency for the terminal.

In other embodiments, the terminals may process their own RF spectral information and provide suggested optimal frequency bands to the network coordinator. The network coordinator would then resolve any conflicts between the terminals and transmit back to the terminals their respective optimal frequency band(s), both for transmitting and receiving of signals with other terminals in the network. Again, each terminal has an optimal receiving frequency band, but may utilize a plurality of optimal transmitting frequency bands for the other remote terminals in the network.

Figure 10:
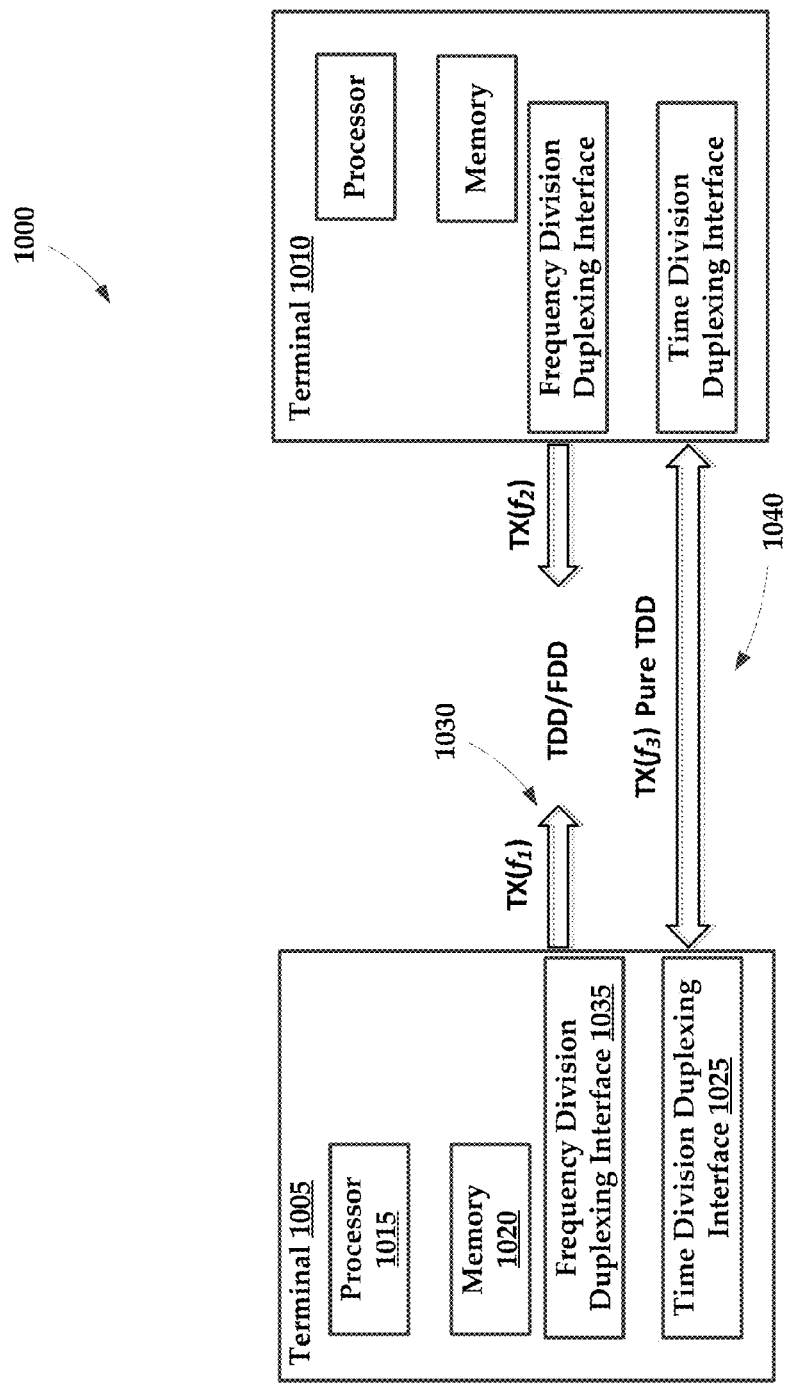
FIG. 10 is a schematic diagram of a method of channel optimization executed by dual channel network devices (e.g., terminals)

FIG. 10 illustrates an exemplary network 1000 having two dual channel terminals that are communicating with one another using the TDD/FDD methods provided herein. In detail, each of the terminals 1005 and 1010, include a processor 1015 and a memory 1020 for storing executable instructions. The processor 1015 executes the instructions to perform methods of dual channel optimization as provided below.

For purposes of brevity, it will be understood that the terminals 1005 and 1010 are constructed similarly to one another. Furthermore, these terminals are similar to the terminals of FIGS. 1A and 1B with the exception that they are configured with dual communication interfaces.

For example, both of the terminals 1005 and 1010 each include a time division duplexing interface 1025 for transmitting or receiving data on a first channel 1030 and a frequency division duplexing interface 1035 for transmitting or receiving data on a second channel 1040. The terminals 1005 and 1010 transmit data over a wireless link 130, which comprises both the first and second channels 1030 and 1040.

Each of the terminals may be configured to determine radio frequency (RF) spectral information local to the terminal. Furthermore, each terminal may select an optimal frequency band for the first channel 1030 based upon the RF spectral information.

Each of the terminals is also configured to select an optimal frequency band for the second channel 1040 based upon the RF spectral information.

As mentioned previously, rather than the terminal itself determining optimal frequency bands for the first and second channels, this functionality may be performed by other terminals in the network or by a network coordinator.

In some instances, each of the terminals may transmit management frames that include the optimal frequency band for the first channel and the optimal frequency band for the second channel to one or more additional devices on the network.

In this embodiment, the terminal 1005 may also be configured to receive data from another terminal 1010 on either of the first and second channels 1030 and 1040, using the desired frequency for each channel.

For devices with dual channel capability, a combination of pure TDD and TDD/FDD modes of operation can be used on each channel. See FIG. 5 for an example of pure TDD mode of operation one channel, and TDD/FDD mode of operation on the second channel. Dynamic channel selection and RF spectrum monitoring can be performed separately for each channel.

Use Case

A point-to-point link of 26.4 miles between two sites in Northern California is established between a first terminal and a second terminal. At the site for each end of the link, the RF spectrum is measured.

Figure 11:
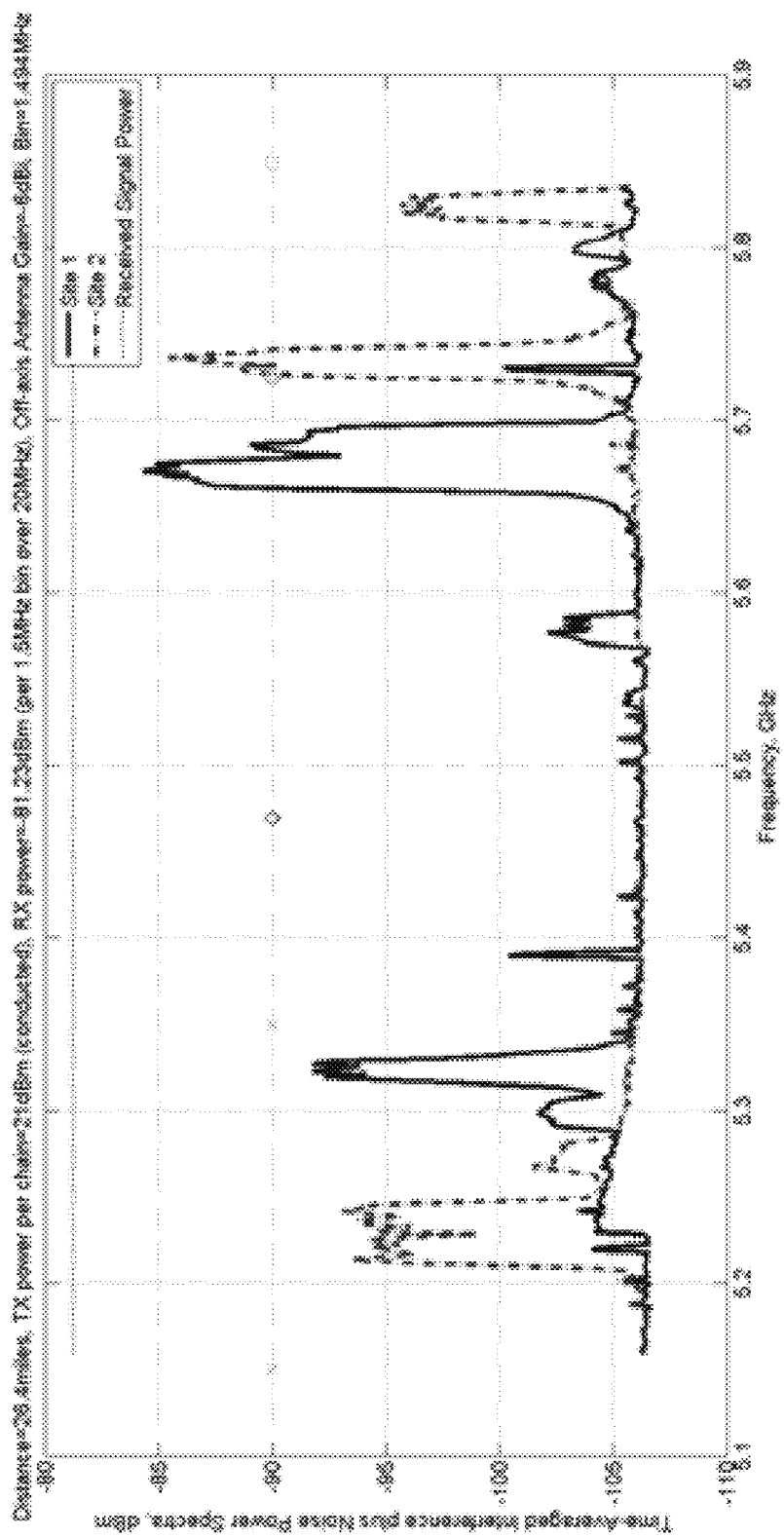
FIG. 11 is a graphical plot of time-averaged interference plus noise versus frequency band at two locations, each associated with a terminal device.

FIG. 11 plots the time-averaged RF power due to interference plus noise at each of the two sites, and overlaid on top of each other. This shows that the RF spectra at two sites can be quite different.

Figure 12:
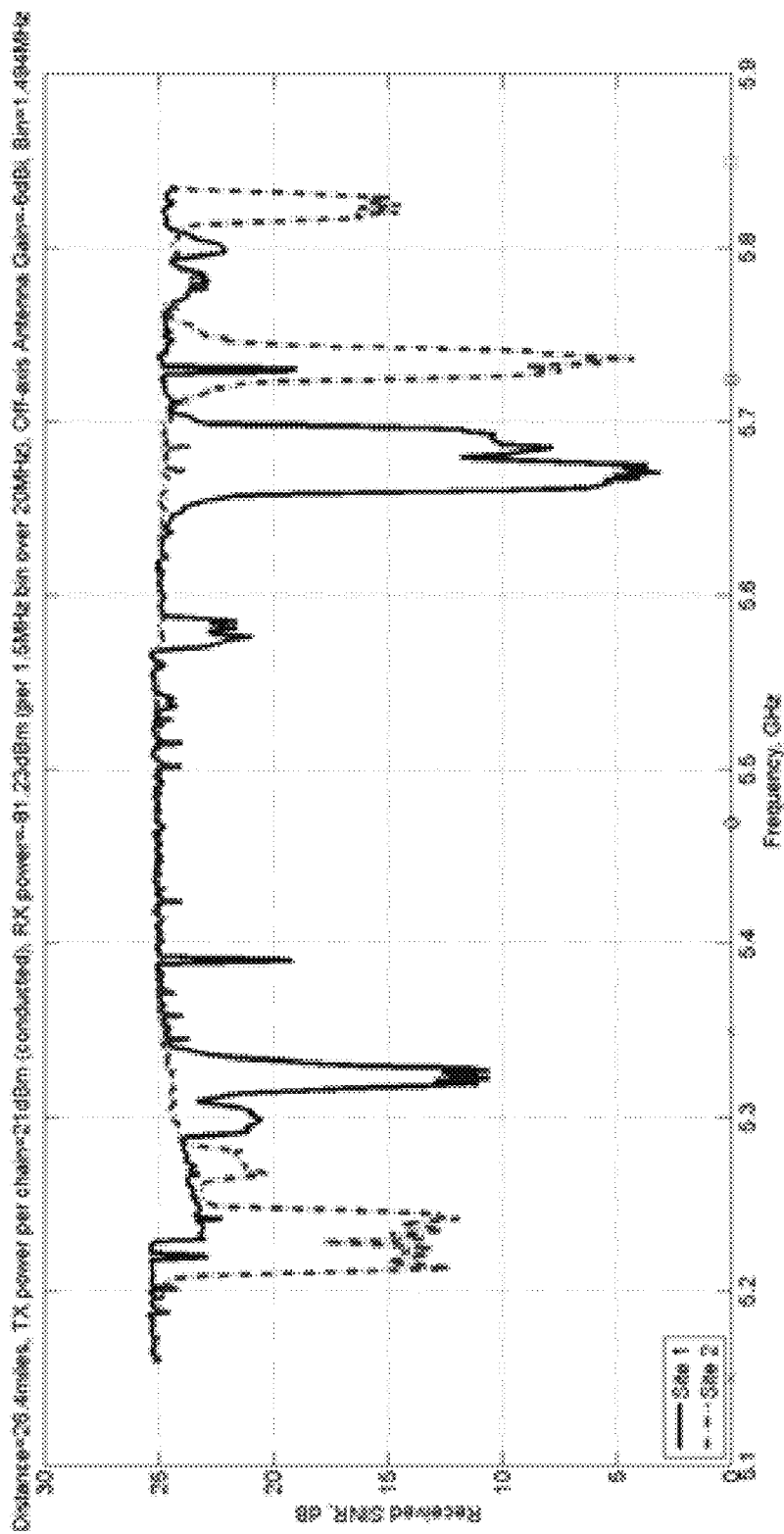
FIG. 12 is a graphical plot of received signal to noise ration versus frequency bands at the two locations.

FIG. 12 plots the similar data from the RF spectrum measurements in terms of received SINR at each of the two sites. This is correlates to the achievable MCS and rate in the presence of interference and noise at each frequency band.

Figure 13:
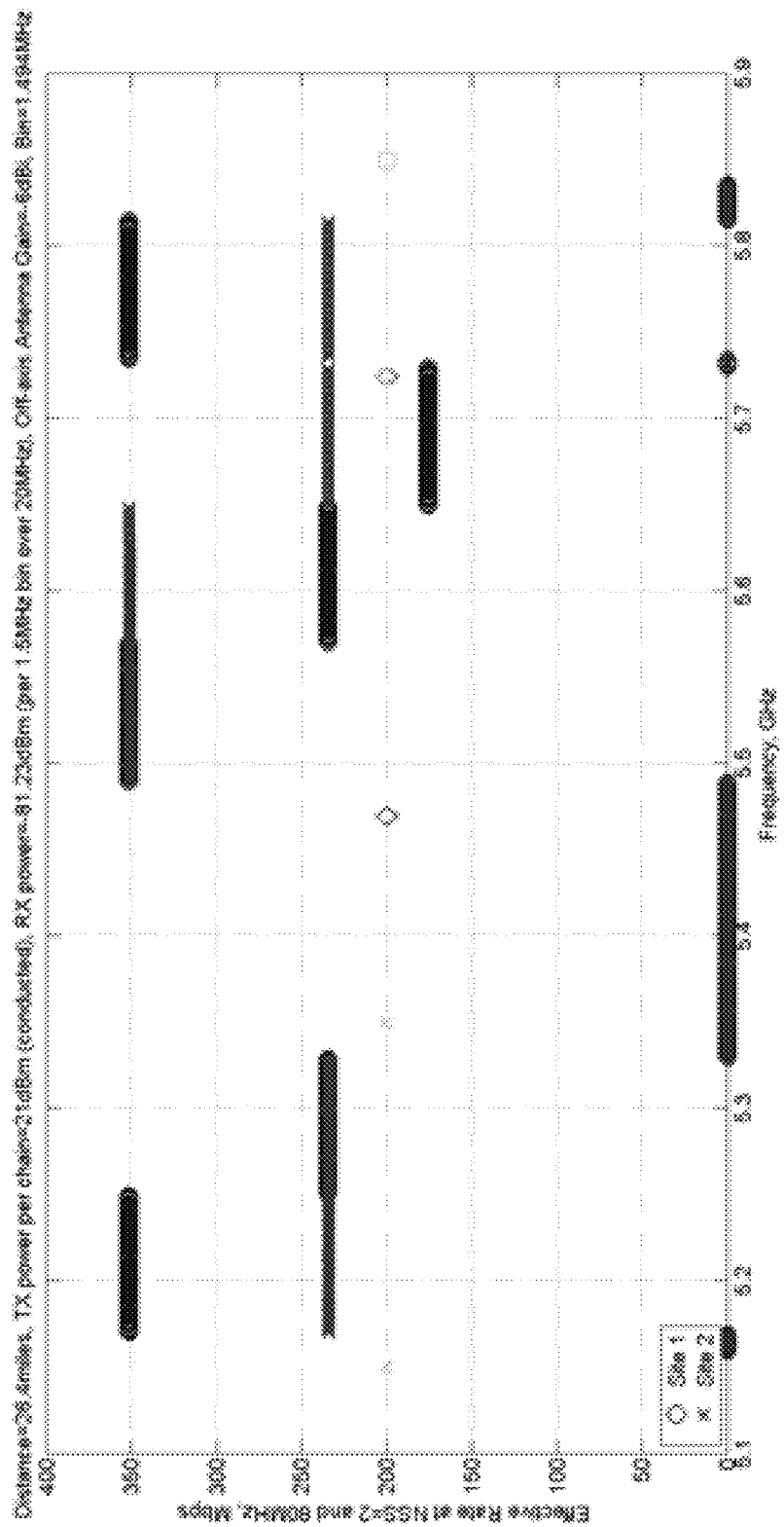
FIG. 13 is a graphical representation of available 80 MHz with number of spatial streams (NSS) of 2 and an effective rate for different frequency bands at the two locations.

FIG. 13 shows as an example for each of the 80 MHz channels (based on IEEE 802.11ac channels) the effective rate that can be achieved. To achieve the highest rate at 351 Mbps, there are three 80 MHz channels available at Site 1, and two 80 MHz channels available at Site 2 for TDD/FDD mode of operation. For pure TDD mode of operation, there is only one 80 MHz band available. For these two locations, TDD/FDD mode of operation is able to provide better throughput and reliability than pure TDD mode of operation.

Figure 14:
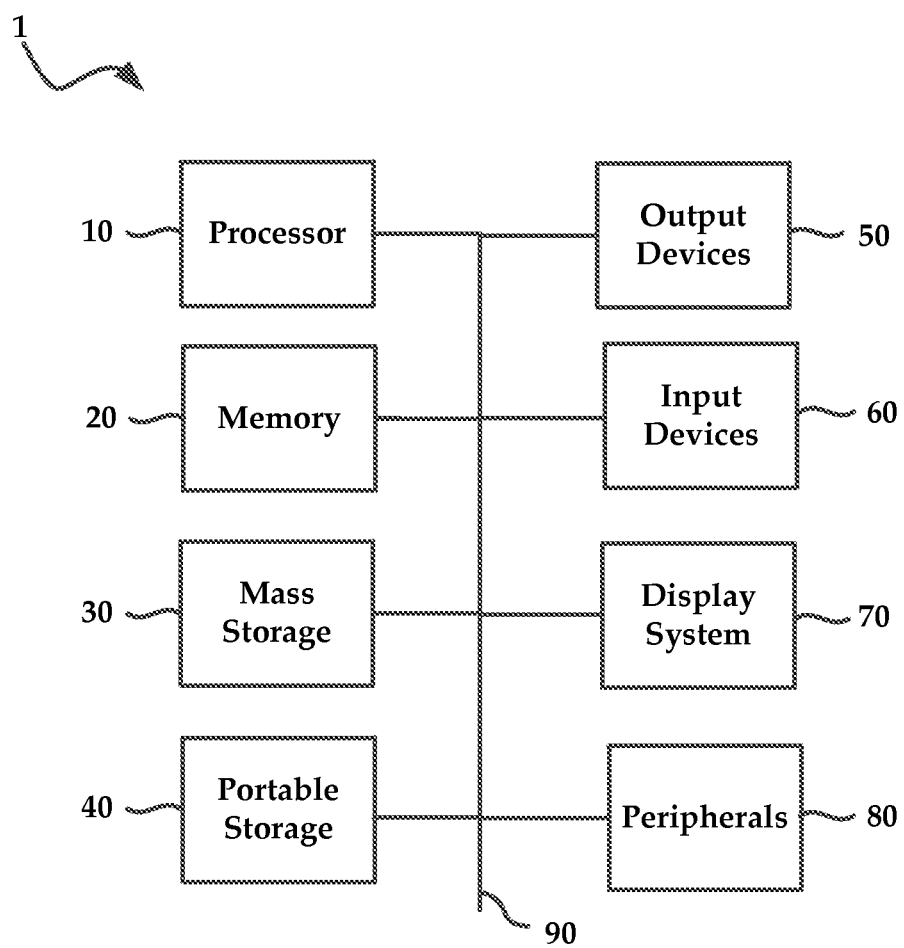
FIG. 14 illustrates an exemplary computing system that may be used to implement embodiments according to the present technology.

FIG. 14 illustrates an exemplary computing device 1 that may be used to implement an embodiment of the present systems and methods. The system 1 of FIG. 14 may be implemented in the contexts of the likes of computing devices, radios, terminals, networks, servers, or combinations thereof. The computing device 1 of FIG. 14 includes a processor 10 and main memory 20. Main memory 20 stores, in part, instructions and data for execution by processor 10. Main memory 20 may store the executable code when in operation. The system 1 of FIG. 14 further includes a mass storage device 30, portable storage device 40, output devices 50, user input devices 60, a display system 70, and peripherals 80.

The components shown in FIG. 14 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 14. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 14 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 14 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for transmitting data between network devices using channel optimization in half duplex communications, the method comprising:
    obtaining at a first terminal, radio frequency (RF) spectral information local to the first terminal;
    determining at the first terminal a first terminal optimal frequency band for the first terminal from the RF spectral information;
    transmitting to a second terminal the first terminal optimal frequency band for use by the second terminal when transmitting data to the first terminal, the second terminal not being co-located with the first terminal;
    receiving from the second terminal any of:
        RF spectral information local to the second terminal; and
        a second terminal optimal frequency band;
    if receiving RF spectral information local to the second terminal;
        determining the second terminal optimal frequency band using the RF spectral information for the second terminal;
    transmitting data to the second terminal on the second terminal optimal frequency band; and
    receiving data from the second terminal on the first terminal optimal frequency band.

2. The method according to claim 1, wherein the first terminal and the second terminal each determine their respective RF spectral information by any of:
    scanning the local RF spectral information on a periodic basis;
    scanning the local RF spectral information upon determining a loss of signal quality; and
    upon receiving a request from a network device to scan for the local RF spectral information, wherein the first and the second terminals are network devices.

3. The method according to claim 1, wherein the first terminal optimal frequency band includes a frequency band having maximum available throughput for a wireless link established between the first terminal and the second terminal, as determined from analysis of local RF spectral information.

4. The method according to claim 1, wherein the first terminal optimal frequency band and the second terminal optimal frequency band are different from one another.

5. The method according to claim 1, further comprising any of:

transmitting, by the first terminal, the radio frequency (RF) spectral information for the first terminal; and receiving, by the first terminal, the radio frequency (RF) spectral information for the second terminal.

6. The method according to claim 5, further comprising analyzing the radio frequency (RF) spectral information for the second terminal to determine the second terminal optimal frequency band.

7. The method according to claim 1, further comprising encapsulating the radio frequency (RF) spectral information for the first terminal in a management frame and transmitting the management frame over a wireless link to additional terminals.

8. The method according to claim 1, further comprising receiving from the second terminal the second terminal optimal frequency band for the second terminal.

9. A network coordinator for a network using time division duplexing or time division multiple access, the network coordinator comprising:

a processor; and a memory for storing executable instructions, the processor executing the instructions to perform operations comprising:

establishing a wireless link with a plurality of terminal devices;

receiving from the plurality of terminal devices, radio frequency (RF) spectral information;

exchanging the RF spectral information between the plurality of terminal devices; and negotiating a frequency band for each of the plurality of terminal devices such that a product or a sum of a forward link and a reverse link throughput for each of the plurality of terminal devices is jointly maximized on the wireless link, the forward and reverse link throughput being determined from an analysis of the radio frequency (RF) spectral information for the plurality of terminal devices.

10. The network coordinator according to claim 9, wherein the processor further executes the instructions to perform an operation of requesting updated radio frequency (RF) spectral information from one or more of the plurality of terminal devices when the network coordinator determines that a degradation in signal strength of the one or more of the plurality of terminal devices has exceeded a threshold.

11. The network coordinator according to claim 9, wherein the processor further executes the instructions to perform an operation of assigning a transmission period to each of the plurality of terminal devices.

12. The network coordinator according to claim 11, wherein the plurality of terminal devices operates in half-duplex mode using any of carrier sensing and token exchange rather than requiring the network coordinator to assign transmission periods to the plurality of terminal devices.

13. The network coordinator according to claim 9, wherein at least a portion of the plurality of terminal devices transmit a preferred frequency band in lieu of or in addition to RF spectral information.

14. The network coordinator according to claim 9, wherein the processor further executes the instructions to perform an operation of renegotiating a frequency band for each of the plurality of terminal devices when updated RF spectral information is received from at least one of the plurality of terminal devices.

15. The network coordinator according to claim 9, wherein the network coordinator is a point-to-point device that supports communication between two or more terminal devices or a point-to-multipoint device that supports communication between a first terminal device and a plurality of other terminal devices.

16. The network coordinator according to claim 9, wherein the network coordinator creates management frame for each of the plurality of terminal devices, wherein each management frame for each of the plurality of terminal devices includes an optimal receiving frequency and a plurality of optimal transmitting frequencies.

17. A terminal device, comprising:

a processor; and a memory for storing executable instructions, wherein execution of the instructions causes the processor to:

determine radio frequency (RF) spectral information local to the terminal device;

analyze RF spectral information for one or more additional terminal devices in a network that are not co-located with the terminal device;

determine an optimal frequency band for each of the one or more additional terminal devices;

transmit data to the one or more additional terminal devices using the determined optimal frequency bands; and receive data from the one or more additional terminal devices on a device optimal frequency band that is based upon the RF spectral information local to the terminal device.

18. The terminal device according to claim 17, wherein the terminal device informs the one or more additional terminal devices of the device optimal frequency band by transmitting the device optimal frequency band to a network coordinator.

19. The terminal device according to claim 17, wherein the terminal device determines the RF spectral information by any of:

scanning the local RF spectral information on a periodic basis;

scanning the local RF spectral information upon determining a loss of signal quality; and upon receiving a request from a network device to scan for local RF spectral information, wherein the network device includes any of a network coordinator or the one or more additional terminal devices.

20. The terminal device according to claim 17, wherein the optimal frequency band includes a frequency band having maximum available throughput for a wireless link, as determined from analysis of local RF spectral information.

21. The terminal device according to claim 17, wherein the device determined optimal frequency band and the one or more additional device optimal frequency bands are different from one another.

22. The terminal device according to claim 17, wherein the terminal device is further configured to:

transmit the radio frequency (RF) spectral information for the terminal device to the one or more additional terminal devices; and receive radio frequency (RF) spectral information for the one or more additional terminal devices.

23. The terminal device according to claim 22, wherein the terminal device is further configured to request updated RF spectral information from the one or more additional terminal devices.

24. The terminal device according to claim 17, wherein the terminal device is further configured to:

encapsulate the radio frequency (RF) spectral information in a management frame; and transmit the management frame over a wireless link to the one or more additional terminal devices.

25. The terminal device according to claim 17, wherein the terminal device is further configured to receive from at least a portion of the one or more additional terminal devices, a desired optimal frequency band in lieu of the RF spectral information.

26. The terminal device according to claim 17, wherein the device optimal frequency band is selected at the terminal device by analyzing the RF spectral information for the terminal device to determine a signal-to-noise ratio, an error vector magnitude, an interference plus noise power spectrum, or an overlapping basic service set traffic activity.

* * * * *